(12) United States Patent
Pacheco et al.

(10) Patent No.: US 9,104,456 B2
(45) Date of Patent: Aug. 11, 2015

(54) ZONE MANAGEMENT OF COMPUTE-CENTRIC OBJECT STORES

(71) Applicants: David Pacheco, San Francisco, CA (US); Mark Cavage, Seattle, WA (US); Yunong Xiao, Seattle, WA (US); Gerald Jelinek, Colorado Springs, CO (US); Bryan Cantrill, Piedmont, CA (US)

(72) Inventors: David Pacheco, San Francisco, CA (US); Mark Cavage, Seattle, WA (US); Yunong Xiao, Seattle, WA (US); Gerald Jelinek, Colorado Springs, CO (US); Bryan Cantrill, Piedmont, CA (US)

(73) Assignee: Joyent, Inc., San Francisco, CA (US)

( * ) Notice: Subject to any disclaimer, the term of this patent is extended or adjusted under 35 U.S.C. 154(b) by 0 days.

(21) Appl. No.: 13/831,292

(22) Filed: Mar. 14, 2013

(65) Prior Publication Data

US 2014/0282512 A1    Sep. 18, 2014

(51) Int. Cl.
*G06F 9/455* (2006.01)
*G06F 9/46* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | | |
|---|---|---|---|
| 6,088,694 A | 7/2000 | Burns et al. | |
| 6,393,495 B1 | 5/2002 | Flory et al. | |
| 6,553,391 B1 | 4/2003 | Goldring et al. | |
| 6,901,594 B1 | 5/2005 | Cain et al. | |
| 7,222,345 B2 | 5/2007 | Gray et al. | |
| 7,265,754 B2 | 9/2007 | Brauss | |
| 7,379,994 B2 | 5/2008 | Collazo | |
| 7,383,327 B1 | 6/2008 | Tormasov et al. | |
| 7,437,730 B2 | 10/2008 | Goyal | |
| 7,529,780 B1 | 5/2009 | Braginsky et al. | |
| 7,581,219 B2 | 8/2009 | Neiger et al. | |
| 7,603,671 B2 | 10/2009 | Liu | |
| 7,640,547 B2 | 12/2009 | Neiman et al. | |
| 7,685,148 B2 | 3/2010 | Engquist et al. | |
| 7,774,457 B1 | 8/2010 | Talwar et al. | |
| 7,814,465 B2 | 10/2010 | Liu | |
| 7,849,111 B2 | 12/2010 | Huffman et al. | |
| 7,899,901 B1 | 3/2011 | Njemanze et al. | |
| 7,904,540 B2 | 3/2011 | Hadad et al. | |
| 7,917,599 B1 | 3/2011 | Gopalan et al. | |
| 7,933,870 B1 | 4/2011 | Webster | |
| 7,940,271 B2 | 5/2011 | Wright et al. | |
| 7,941,510 B1 | 5/2011 | Tormasov et al. | |
| 8,006,079 B2 | 8/2011 | Goodson et al. | |

(Continued)

FOREIGN PATENT DOCUMENTS

| WO | 2011/088224 | 7/2011 |
|---|---|---|
| WO | W02012125143 | 9/2012 |
| WO | W02012125144 | 9/2012 |

OTHER PUBLICATIONS

Bi et al. "Dynamic Provisioning Modeling for Virtualized Multi-tier Applications in Cloud Data Center". 2010 IEEE 3rd International Conference on Cloud Computing. pp. 370-377.

(Continued)

*Primary Examiner* — Tammy Lee
(74) *Attorney, Agent, or Firm* — Carr & Ferrell LLP (57) ABSTRACT

Zone management of compute-based object stores is provided herein. An exemplary method may include assigning a virtual operating system container from the reserve zone pool to a task group, the task group including a set of tasks for a phase of a first request, and executing the set of tasks within the assigned virtual operating system container.

17 Claims, 6 Drawing Sheets

(56) References Cited

U.S. PATENT DOCUMENTS

| | | |
|---|---|---|
| 8,010,498 B2 | 8/2011 | Gounares et al. |
| 8,141,090 B1 | 3/2012 | Graupner et al. |
| 8,181,182 B1 | 5/2012 | Martin |
| 8,244,559 B2 | 8/2012 | Horvitz et al. |
| 8,301,746 B2 | 10/2012 | Head et al. |
| 8,332,206 B1 | 12/2012 | Sadovsky et al. |
| 8,336,051 B2 * | 12/2012 | Gokulakannan ............... 718/101 |
| 8,346,935 B2 | 1/2013 | Mayo et al. |
| 8,370,936 B2 | 2/2013 | Zuk et al. |
| 8,397,088 B1 | 3/2013 | Ghose |
| 8,417,673 B2 | 4/2013 | Stakutis et al. |
| 8,417,746 B1 | 4/2013 | Gillett, Jr. et al. |
| 8,429,282 B1 | 4/2013 | Ahuja et al. |
| 8,434,081 B2 | 4/2013 | Cervantes et al. |
| 8,464,251 B2 | 6/2013 | Sahita et al. |
| 8,468,251 B1 | 6/2013 | Pijewski et al. |
| 8,547,379 B2 | 10/2013 | Pacheco et al. |
| 8,555,276 B2 | 10/2013 | Hoffman et al. |
| 8,631,131 B2 * | 1/2014 | Kenneth et al. ............... 709/226 |
| 8,677,359 B1 | 3/2014 | Cavage et al. |
| 8,775,485 B1 | 7/2014 | Cavage et al. |
| 8,782,224 B2 | 7/2014 | Pijewski et al. |
| 8,789,050 B2 | 7/2014 | Hoffman et al. |
| 8,793,688 B1 | 7/2014 | Mustacchi et al. |
| 8,826,279 B1 | 9/2014 | Pacheco et al. |
| 8,881,279 B2 | 11/2014 | Gregg |
| 8,898,205 B2 | 11/2014 | Cavage et al. |
| 8,943,284 B2 | 1/2015 | Hoffman |
| 8,959,217 B2 | 2/2015 | Mayo et al. |
| 9,021,046 B2 | 4/2015 | Mayo et al. |
| 2002/0069356 A1 | 6/2002 | Kim |
| 2002/0082856 A1 | 6/2002 | Gray et al. |
| 2002/0156767 A1 | 10/2002 | Costa et al. |
| 2002/0198995 A1 | 12/2002 | Liu et al. |
| 2003/0004702 A1 | 1/2003 | Higinbotham |
| 2003/0154112 A1 | 8/2003 | Neiman et al. |
| 2003/0163596 A1 | 8/2003 | Halter et al. |
| 2004/0088293 A1 | 5/2004 | Daggett |
| 2005/0097514 A1 | 5/2005 | Nuss |
| 2005/0108712 A1 | 5/2005 | Goyal |
| 2005/0188075 A1 | 8/2005 | Dias et al. |
| 2006/0107087 A1 | 5/2006 | Sieroka et al. |
| 2006/0153174 A1 | 7/2006 | Towns-von Stauber et al. |
| 2006/0218285 A1 | 9/2006 | Talwar et al. |
| 2006/0246879 A1 | 11/2006 | Miller et al. |
| 2006/0248294 A1 | 11/2006 | Nedved et al. |
| 2006/0294579 A1 | 12/2006 | Khuti et al. |
| 2007/0088703 A1 | 4/2007 | Kasiolas et al. |
| 2007/0118653 A1 | 5/2007 | Bindal |
| 2007/0168336 A1 | 7/2007 | Ransil et al. |
| 2007/0179955 A1 | 8/2007 | Croft et al. |
| 2007/0250838 A1 | 10/2007 | Belady et al. |
| 2007/0271570 A1 * | 11/2007 | Brown et al. ............... 718/105 |
| 2008/0080396 A1 | 4/2008 | Meijer et al. |
| 2008/0103861 A1 | 5/2008 | Zhong |
| 2008/0155110 A1 | 6/2008 | Morris |
| 2009/0044188 A1 * | 2/2009 | Kanai et al. ............... 718/100 |
| 2009/0077235 A1 | 3/2009 | Podila |
| 2009/0092124 A1 | 4/2009 | Singhal et al. |
| 2009/0164990 A1 | 6/2009 | Ben-Yehuda et al. |
| 2009/0172051 A1 | 7/2009 | Huffman et al. |
| 2009/0193410 A1 | 7/2009 | Arthursson et al. |
| 2009/0216910 A1 | 8/2009 | Duchesneau |
| 2009/0259345 A1 | 10/2009 | Kato et al. |
| 2009/0260007 A1 | 10/2009 | Beaty et al. |
| 2009/0300210 A1 | 12/2009 | Ferris |
| 2009/0300635 A1 | 12/2009 | Ferris |
| 2010/0050172 A1 | 2/2010 | Ferris |
| 2010/0057913 A1 | 3/2010 | DeHaan |
| 2010/0106820 A1 | 4/2010 | Gulati et al. |
| 2010/0114825 A1 | 5/2010 | Siddegowda |
| 2010/0125845 A1 | 5/2010 | Sugumar et al. |
| 2010/0131324 A1 | 5/2010 | Ferris |
| 2010/0131624 A1 | 5/2010 | Ferris |
| 2010/0131649 A1 | 5/2010 | Ferris |
| 2010/0131854 A1 | 5/2010 | Little |
| 2010/0153958 A1 * | 6/2010 | Richards et al. ............... 718/104 |
| 2010/0162259 A1 | 6/2010 | Koh et al. |
| 2010/0223383 A1 | 9/2010 | Salevan et al. |
| 2010/0223385 A1 | 9/2010 | Gulley et al. |
| 2010/0228936 A1 | 9/2010 | Wright et al. |
| 2010/0235632 A1 | 9/2010 | Iyengar et al. |
| 2010/0250744 A1 | 9/2010 | Hadad et al. |
| 2010/0262752 A1 | 10/2010 | Davis et al. |
| 2010/0268764 A1 | 10/2010 | Wee et al. |
| 2010/0299313 A1 | 11/2010 | Orsini et al. |
| 2010/0306765 A1 | 12/2010 | DeHaan |
| 2010/0306767 A1 | 12/2010 | DeHaan |
| 2010/0318609 A1 | 12/2010 | Lahiri et al. |
| 2010/0325495 A1 | 12/2010 | Talla et al. |
| 2010/0332262 A1 | 12/2010 | Horvitz et al. |
| 2010/0332629 A1 | 12/2010 | Cotugno et al. |
| 2010/0333087 A1 | 12/2010 | Vaidyanathan et al. |
| 2011/0004566 A1 | 1/2011 | Berkowitz et al. |
| 2011/0016214 A1 | 1/2011 | Jackson |
| 2011/0029969 A1 | 2/2011 | Venkataraja et al. |
| 2011/0029970 A1 * | 2/2011 | Arasaratnam ............... 718/1 |
| 2011/0047315 A1 | 2/2011 | De Dinechin et al. |
| 2011/0055377 A1 | 3/2011 | DeHaan |
| 2011/0055396 A1 | 3/2011 | DeHaan |
| 2011/0055398 A1 | 3/2011 | DeHaan et al. |
| 2011/0078303 A1 | 3/2011 | Li et al. |
| 2011/0107332 A1 | 5/2011 | Bash |
| 2011/0125812 A1 * | 5/2011 | Kandasamy et al. ............... 707/813 |
| 2011/0131306 A1 | 6/2011 | Ferris et al. |
| 2011/0131329 A1 | 6/2011 | Kaplinger et al. |
| 2011/0131589 A1 | 6/2011 | Beaty et al. |
| 2011/0138382 A1 | 6/2011 | Hauser et al. |
| 2011/0138441 A1 | 6/2011 | Neystadt et al. |
| 2011/0145392 A1 | 6/2011 | Dawson et al. |
| 2011/0153724 A1 | 6/2011 | Raja et al. |
| 2011/0161952 A1 | 6/2011 | Poddar et al. |
| 2011/0172987 A1 | 7/2011 | Kent et al. |
| 2011/0173470 A1 | 7/2011 | Tran |
| 2011/0179132 A1 | 7/2011 | Mayo et al. |
| 2011/0179134 A1 | 7/2011 | Mayo et al. |
| 2011/0179162 A1 | 7/2011 | Mayo et al. |
| 2011/0185063 A1 | 7/2011 | Head et al. |
| 2011/0219372 A1 | 9/2011 | Agrawal et al. |
| 2011/0270968 A1 | 11/2011 | Salsburg et al. |
| 2011/0276951 A1 | 11/2011 | Jain |
| 2011/0296021 A1 | 12/2011 | Dorai et al. |
| 2011/0302378 A1 | 12/2011 | Siebert |
| 2011/0302583 A1 * | 12/2011 | Abadi et al. ............... 718/102 |
| 2011/0320520 A1 | 12/2011 | Jain |
| 2012/0017210 A1 | 1/2012 | Huggins et al. |
| 2012/0054742 A1 | 3/2012 | Eremenko et al. |
| 2012/0060171 A1 * | 3/2012 | Abouzour ............... 718/105 |
| 2012/0066682 A1 | 3/2012 | Al-Aziz et al. |
| 2012/0079480 A1 | 3/2012 | Liu |
| 2012/0089980 A1 | 4/2012 | Sharp et al. |
| 2012/0124211 A1 | 5/2012 | Kampas et al. |
| 2012/0131156 A1 | 5/2012 | Brandt et al. |
| 2012/0131591 A1 | 5/2012 | Moorthi et al. |
| 2012/0159507 A1 * | 6/2012 | Kwon et al. ............... 718/104 |
| 2012/0167081 A1 | 6/2012 | Sedayao et al. |
| 2012/0173709 A1 | 7/2012 | Li et al. |
| 2012/0179874 A1 | 7/2012 | Chang et al. |
| 2012/0185913 A1 | 7/2012 | Martinez et al. |
| 2012/0198442 A1 | 8/2012 | Kashyap et al. |
| 2012/0204176 A1 | 8/2012 | Tian et al. |
| 2012/0221845 A1 | 8/2012 | Ferris |
| 2012/0233315 A1 | 9/2012 | Hoffman et al. |
| 2012/0233626 A1 | 9/2012 | Hoffman et al. |
| 2012/0246517 A1 | 9/2012 | Bender et al. |
| 2012/0266231 A1 | 10/2012 | Spiers et al. |
| 2012/0284714 A1 | 11/2012 | Venkitachalam et al. |
| 2012/0303773 A1 | 11/2012 | Rodrigues |
| 2012/0311012 A1 | 12/2012 | Mazhar et al. |
| 2013/0042115 A1 | 2/2013 | Sweet et al. |
| 2013/0060946 A1 * | 3/2013 | Kenneth et al. ............... 709/226 |
| 2013/0067067 A1 | 3/2013 | Miri et al. |
| 2013/0081016 A1 * | 3/2013 | Saito et al. ............... 718/1 |
| 2013/0086590 A1 * | 4/2013 | Morris et al. ............... 718/102 |

(56) References Cited

U.S. PATENT DOCUMENTS

| | | | |
|---|---|---|---|
| 2013/0129068 A1 | 5/2013 | Lawson et al. | |
| 2013/0132057 A1 | 5/2013 | Deng et al. | |
| 2013/0169666 A1 | 7/2013 | Pacheco et al. | |
| 2013/0173803 A1 | 7/2013 | Pijewski et al. | |
| 2013/0179881 A1* | 7/2013 | Calder et al. | 718/1 |
| 2013/0191835 A1* | 7/2013 | Araki | 718/102 |
| 2013/0191836 A1* | 7/2013 | Meyer | 718/103 |
| 2013/0254407 A1 | 9/2013 | Pijewski et al. | |
| 2013/0318525 A1* | 11/2013 | Palanisamy et al. | 718/1 |
| 2013/0328909 A1 | 12/2013 | Pacheco et al. | |
| 2013/0339966 A1* | 12/2013 | Meng et al. | 718/102 |
| 2013/0346974 A1 | 12/2013 | Hoffman et al. | |
| 2014/0279955 A1 | 9/2014 | Cavage et al. | |
| 2014/0280198 A1 | 9/2014 | Cavage et al. | |
| 2014/0280796 A1 | 9/2014 | Pijewski | |
| 2014/0280912 A1 | 9/2014 | Gregg | |
| 2014/0280970 A1 | 9/2014 | Pijewski et al. | |
| 2014/0281304 A1 | 9/2014 | Hoffman | |
| 2014/0282513 A1 | 9/2014 | Pacheco et al. | |
| 2014/0282590 A1 | 9/2014 | Cavage et al. | |
| 2014/0282615 A1 | 9/2014 | Cavage et al. | |
| 2014/0283053 A1 | 9/2014 | Gregg | |

OTHER PUBLICATIONS

Chappell, David. "Introducing Windows Azure". Microsoft Corporation. Oct. 2010. pp. 1-25.
Yagoubi, Belabbas et al., "Load Balancing in Grid Computing," Asian Journal of Information Technology, vol. 5, No. 10, pp. 1095-1103, 2006.
Kramer, "Advanced Message Queuing Protocol (AMQP)," Linux Journal, Nov. 2009, p. 1-3.
Subramoni et al., "Design and Evaluation of Benchmarks for Financial Applications Using Advanced Message Queuing Protocol (AMQP) over InfiniBand," Nov. 2008.
Richardson et al., "Introduction to RabbitMQ," Sep. 2008, p. 1-33.
Bernstein et al., "Using XMPP as a Transport in Intercloud Protocols," Jun. 22, 2010, p. 1-8.
Bernstein et al., "Blueprint for the Intercloud—Protocols and Formats for Cloud Computing Interoperabiilty," May 28, 2009, p. 328-336.
Gregg, Brendan, "Visualizing System Latency," May 1, 2010, ACM Queue, p. 1-13,queue.acm.org/detail.cfm?id=1809426.
Gregg, Brendan, "Heat Map Analytics," Mar. 17, 2009, Oracle, p. 1-7,blogs.oracle.com/brendan/entry/heat_map_analytics.
Mundigl, Robert, "There is More Than One Way to Heat a Map," Feb. 10, 2009, Clearly and Simply, p. 1-12, learlyandsimply.com/clearly_and_simply/2009/02/there-is-more-than-one-way-to-heat-a-map.html.
Chef Documents. Retrieved Mar. 11, 2014 from docs.opscode.com/.
Ansible Documentation. Retrieved Mar. 11, 2014 from docs.ansible.com/.
Bill Pijewski's Blog. Retrieved Mar. 12, 2014 from dtrace.org/blogs/wdp/2011/03/our-zfs-io-throttle/.
Brendan's Blog. Retrieved Mar. 12, 2014 from dtrace.org/blogs/brendan/2011/03/08/busy-week-zfs-throttling- dtrace-node-js-and-cloud-analytics/.
Joyent ZFS Performance Analysis and Tools. Retrieved Mar. 12, 2014 from slideshare.net/brendangregg/zfsperftools2012.
Block 10 Controller. Retrieved Mar. 12, 2014 from kernel.org/doc/Documentation/cgroups/blkio-controller.txt.
Block Device Bio Throttling Support. Retrieved Mar. 12, 2014 from lwn.net/Articles/403889/.
Gregg, Brendan. Systems Performance: Enterprise and the Cloud, Prentice Hat, 2014, pp. 557-558.
International Search Report and Written Opinion of the International Searching Authority mailed Sep. 1, 2011 in Patent Cooperation Treaty Application No. PCT/US2011/021157 filed Jan. 13, 2011.
International Search Report and Written Opinion of the International Searching Authority mailed May 19, 2011 in Patent Cooperation Treaty Application No. PCT/US2011/028234 filed Mar. 11, 2011.
Mesnier, Michael. I/O throttling. 2006. Retrieved Apr. 13, 2014 from usenix.org/legacy/event/fast07/tech/full_papers/mesnier/mesnier_html/node5.html.
Thusoo et al. "Hive—A Warehousing Solution Over a Map-Reduce Framwork, " Aug. 2009.
International Search Report, May 19, 2011, PCT/US2011/028234, Mar. 11, 2011.
Non-Final Office Action, Dec. 10, 2012, U.S. Appl. No. 13/046,647, filed Mar. 11, 2011.
International Search Report, May 5, 2011, PCT/US2011/028230, Mar. 3, 2011.
Notice of Allowance, Aug. 20, 2012, U.S. Appl. No. 12/696,802, filed Jan. 29, 2010.
Non-Final Office Action, Mar. 27, 2012, U.S. Appl. No. 12/696,802, filed Jan. 29, 2010.
Non-Final Office Action, Mar. 2, 2011, U.S. Appl. No. 12/696,619, filed Jan. 29, 2010.
Final Office Action, Jul. 11, 2011, U.S. Appl. No. 12/696,619, filed Jan. 29, 2010.
Non-Final Office Action, May 29, 2012, U.S. Appl. No. 12/696,619, filed Jan. 29, 2010.
Non-Final Office Action, Sep. 6, 2011, U.S. Appl. No. 12/696,334, filed Jan. 29, 2010.
Final Office Action, Jul. 6, 2012, U.S. Appl. No. 12/696,334, filed Jan. 29, 2010.
International Search Report, Sep. 1, 2011, PCT/US2011/021157, Jan. 13, 2011.
Non-Final Office Action, Apr. 12, 2012, U.S. Appl. No. 13/340,461, filed Dec. 29, 2011.
Final Office Action, Nov. 19, 2012, U.S. Appl. No. 13/340,461, filed Dec. 29, 2011.
Notice of Allowance, Feb. 8, 2013, U.S. Appl. No. 13/340,461, filed Dec. 29, 2011.
Non-Final Office Action, Mar. 20, 2012, U.S. Appl. No. 13/340,488, filed Dec. 29, 2011.
Final Office Action, Aug. 15, 2012, U.S. Appl. No. 13/340,488, filed Dec. 29, 2011.
Notice of allowance, May 23, 2013, U.S. Appl. No. 13/340,488, filed Dec. 29, 2011.
Notice of Allowance, Jun. 3, 2013, U.S. Appl. No. 13/046,647, filed Mar. 11, 2011.
Non-Final Office Action, Aug. 12, 2013, U.S. Appl. No. 13/046,660, filed Mar. 11, 2011.
Final Office Action, Feb. 6, 2014, U.S. Appl. No. 13/046,660, filed Mar. 11, 2011.
Advisory Action, Feb. 10, 2014, U.S. Appl. No. 13/829,250, filed Mar. 14, 2013.
Notice of Allowance, Mar. 7, 2014, U.S. Appl. No. 13/835,865, filed Mar. 15, 2013.
Final Office Action, Mar. 19, 2014, U.S. Appl. No. 13/831,349, filed Mar. 14, 2013.
Notice of Allowance, Feb. 19, 2014, U.S. Appl. No. 13/836,599, filed Mar. 15, 2013.
Final Office Action, Jan. 16, 2014, U.S. Appl. No. 13/838,150, filed Mar. 15, 2013.
Final Office Action, Feb. 27, 2014, U.S. Appl. No. 13/890,913, filed Mar. 14, 2013.
Notice of Allowance, Feb. 18, 2014, U.S. Appl. No. 13/899,543, filed May 21, 2013.
Notice of Allowance, Feb. 27, 2014, U.S. Appl. No. 13/963,980, filed Aug. 9, 2013.
Non-Final Office Action, Feb. 11, 2014, U.S. Appl. No. 14/038,653, filed Sep. 26, 2013.
International Search Report, Sep. 26, 2013, PCT/US2011/028230, Mar. 12, 2011.
Non-Final Office Action, Jul. 29, 2013, U.S. Appl. No. 13/829,250, filed Mar. 14, 2013.
Final Office Action, Nov. 26, 2013, U.S. Appl. No. 13/829,250, filed Mar. 14, 2013.
Office Action, Oct. 22, 2013, U.S. Appl. No. 13/835,865, filed Mar. 15, 2013.
Notice of Allowance, Nov. 19, 2013, U.S. Appl. No. 13/831,386, filed Mar. 14, 2013.

(56) References Cited

OTHER PUBLICATIONS

Non-Final Office Action, Sep. 9, 2013, U.S. Appl. No. 13/831,349, filed Mar. 14, 2013.
Non-Final Office Action, Sep. 9, 2013, U.S. Appl. No. 13/836,599, filed Mar. 15, 2013.
Non-Final Office Action, Oct. 4, 2013, U.S. Appl. No. 13/831,292, filed Mar. 14, 2013.
Non-Final Office Action, Sep. 10, 2013, U.S. Appl. No. 13/838,150, filed Mar. 15, 2013.
Non-Final Office Action, Sep. 13, 2013, U.S. Appl. No. 13/830,913, filed Mar. 14, 2013.
Non-Final Office Action, Jul. 29, 2013, U.S. Appl. No. 13/899,543, filed May 21, 2013.
Final Office Action, Dec. 5, 2013, U.S. Appl. No. 13/899,543, filed May 21, 2013.
Non-Final Office Action. Oct. 4, 2013, U.S. Appl. No. 13/963,964, filed Aug. 9, 2013.
Non-Final Office Action, Nov. 13, 2013, U.S. Appl. No. 13/963,980, filed Aug. 9, 2013.
Notice of Allowance, Feb. 4, 2015, U.S. Appl. No. 12/696,619, filed Jan. 29, 2010.
Notice of Allowance, Mar. 24, 2015, U.S. Appl. No. 13/838,150, filed Mar. 15, 2013.
Final Office Action, Feb. 5, 2015, U.S. Appl. No. 13/963,964, filed Aug. 9, 2013.
Non-Final Office Action, Feb. 26, 2015, U.S. Appl. No. 14/243,860, filed Apr. 2, 2014.
Notice of Allowance, Apr. 27, 2015, U.S. Appl. No. 14/243,860, filed Apr. 2, 2014.

* cited by examiner

ZONE MANAGEMENT OF COMPUTE-CENTRIC OBJECT STORES

FIELD OF THE PRESENT TECHNOLOGY

The present technology relates generally to zone management of compute-based object stores. More specifically, but not by limitation, the present technology allows for the management and assignment of compute zones that comprise virtual operating system containers. The present technology assigns zones to task groups to maximize efficiency and ensure fair allocation of resources to multitenant compute-based object stores.

BACKGROUND

Various methods and systems for providing multitenant computing systems, such as cloud computing, have been attempted. In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Oftentimes, these cloud computing systems leverage virtual machines for their users. A virtual machine ("VM") is an emulation of a real-world computing system. Often, the virtual machine provides a user with one or more different operating systems than the operating system of the local machine ("host") that is running the virtual machine. The VM provides a complete system platform that provides the one or more operating systems. The VM is typically managed by a hypervisor that mediates computing resources of the host machine for use by the VM via hardware emulation. The use of hardware emulation is often deleterious to VM performance and, in turn, reduces the number of VMs that may run on a given host machine. Additionally, as the number of VMs on a host machine increases and they begin to operate concurrently, the hypervisor must coordinate the varying workloads of the VMs to prevent instability. Thus, the scheduling required by the hypervisor is critical in ensuring that the underlying hardware system is utilized properly.

SUMMARY OF THE PRESENT TECHNOLOGY

According to some embodiments, the present technology may be directed to systems that comprise: (a) one or more processors; and (b) logic encoded in one or more tangible media for execution by the one or more processors and when executed operable to perform operations comprising: (i) assigning a virtual operating system container from any of a reserve zone pool and a non-reserve zone pool to a task group, the task group comprising a set of tasks for a phase of a request; (ii) and executing the set of tasks within the assigned virtual operating system container.

According to some embodiments, the present technology may be directed to a system that comprises: (a) one or more processors; and (b) logic encoded in one or more tangible media for execution by the one or more processors and when executed operable to perform operations comprising: (i) establishing a reserve zone pool of virtual operating system containers; (ii) assigning a virtual operating system container from the reserve zone pool to a task group, the task group comprising a set of tasks for a phase of a first request; and (iii) executing the set of tasks within the assigned virtual operating system container.

According to some embodiments, the present technology may be directed to a method that comprises: (a) establishing a reserve zone pool of virtual operating system containers; (b) assigning virtual operating system containers from any of a reserve zone pool and a non-reserve pool zone to a plurality of task groups in a proportional manner; (c) establishing an expected concurrency rate for each of the task groups; (d) comparing an actual concurrency rate for each of the task groups to their expected concurrency rate; and (e) reassigning virtual operating system containers to a task group based upon the step of comparing.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Figure 1:
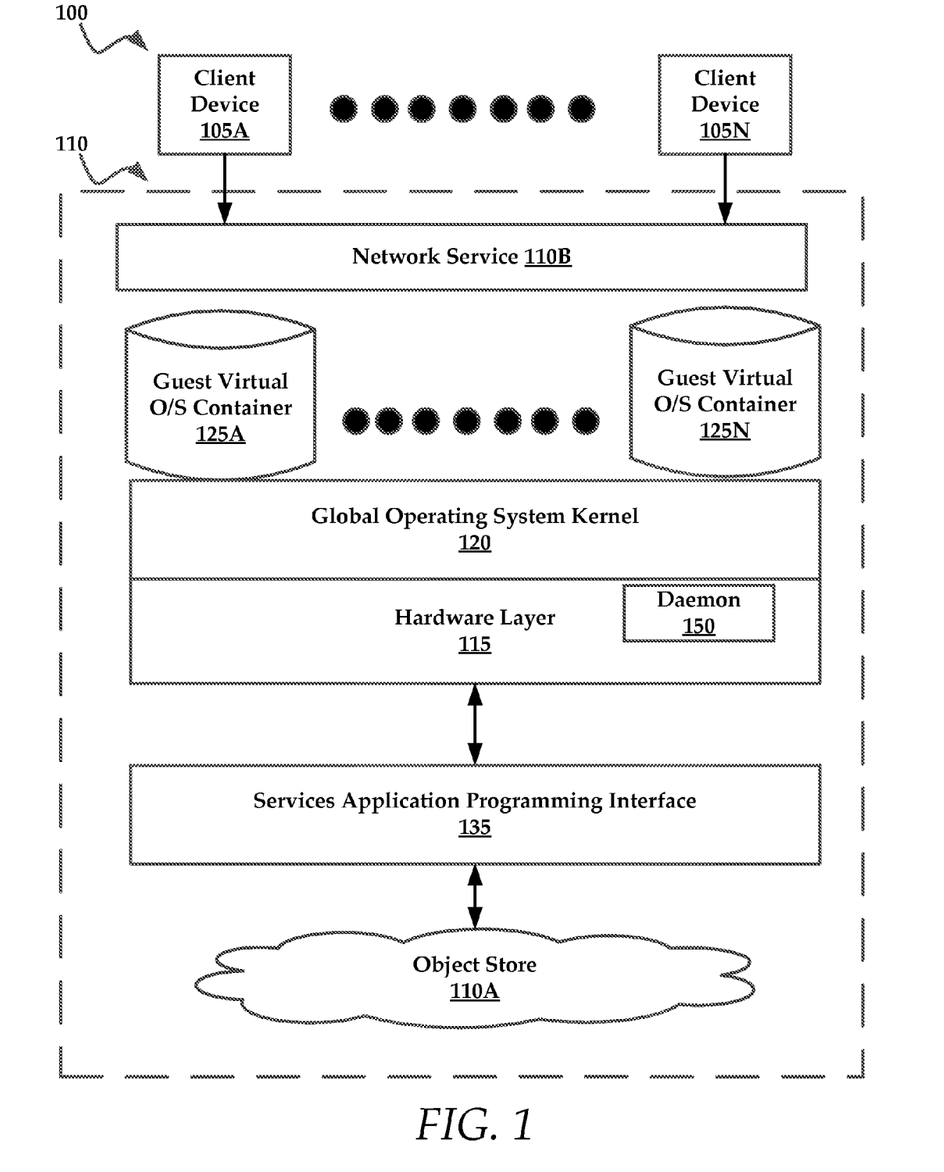
FIG. 1 is a block diagram of an exemplary architecture in which embodiments of the present technology may be practiced.

FIG. 1 is a block diagram of an exemplary architecture 100 in which embodiments of the present technology may be practiced. The architecture 100 comprises a plurality of client devices 105A-N that communicatively couple with a compute-centric object store system, hereinafter "system 110." It will be understood that the architecture 100 may include a plurality of systems, such as system 110. For the sake of brevity and clarity, a detailed description of an exemplary system 110 will be provided below, although the features of the system 110 apply equally to all of the plurality of systems. The plurality of client devices 105A-N may communicatively couple with the system 110 via any one or combination of a number of private and/or public networks, such as the Internet. According to some embodiments, the client devices 105A-N may submit requests or jobs to a network service 110B, which is a constituent part of the system 110. In some instances, the network service 110E evaluates request received from users to determine one or more physical nodes that comprise objects that correspond to the request.

In general, the system 110 comprises an object store 110A that provides "compute" as a first class citizen of an object store 110A. More specifically, compute operations (e.g., instructing the system to compute on objects in the object store) of the present technology resemble a top-level API function, similar to processes like storing or fetching objects in the object store 110A.

It will be understood that the terms "object store" comprise a network service for storing unstructured, arbitrary-sized chunks of data (objects). It will be further understood that the object store may not support modifications to existing objects, but supports full object replacement operations, although systems that support both object modification and full object replacement operations may also utilize the features of the present technology to perform compute operations directly on (e.g., in-situ) objects within the object store.

In some embodiments, the system 110 may be configured to receive a request to perform a compute operation on at least a portion of an object store, from a first user. Again, the user may be associated with one of the client devices. The request identifies parameters of the compute operation as well as objects against which the compute operation is executed.

In some instances, the system 110 may assign virtual operating system containers to a user, based upon a request. The system 110 may map objects to the containers that are associated with the user. Typically, these objects are identified by the user in the request. A virtual operating system container performs the compute operation on an object according to the identified parameters of the request. The system 110 may then clear the virtual operating system containers and return the virtual operating system containers to a pool of virtual operating system containers. Additional aspects of the system 110 will be described in greater detail below.

It will be understood that a compute-centric object store may be created to operate without the user of virtual operating system (global kernel) or virtual operating system containers. While such an object store would provide advantages such as in-situ computation of data (where objects are processed directly on the object store), the object store may not isolate tenants in the similarly to systems that utilize a virtual operating system and/or virtual operating system containers.

In these instances, the compute-centric object store may be configured to receiving a request to perform a compute operation on at least a portion of an object store from a first user via a network service, the request identifying parameters of the compute operation. The object store may also execute an operating system process for the objects identified in the request. The operating system process may perform the compute operation on the object according to the identified parameters of the request. Additionally, once the compute operation has been executed, the operating system process may be terminated by the virtual operating system.

The terms in-situ computation will be understood to include the execution of compute operations against objects in an object store, where the objects not moved or copied from or within the object store.

In some embodiments, the system 110 is comprised of a hardware layer 115 that provides a logical interface with at least one or more processors and a memory which stores logic that is executed by the one or more processors. Generally, the hardware layer 115 controls one or more of the hardware components of a computing system, such as the computing system 600 of FIG. 6, which will be described in greater detail below. By way of non-limiting example, the hardware layer 115 may manage the hardware components of a server blade or another similar device. The hardware layer 115 provides access to the physical hardware that services a global operating system kernel 120 that cooperates with the hardware layer 115. The global operating system kernel 120 may also be referred to as a host operating system kernel.

Generally, the global operating system kernel 120 is configured to administer and manage a pool of guest virtual operating system containers, such as containers 125A-N. The containers 125A-N may operate on a distributed object store in a multitenant manner, where multiple containers can operate on the same object store simultaneously. It will be understood that each user is assigned container from the pool, on an as-needed basis. When a container is applied to an object store the container is referred to as a tenant.

According to some embodiments, the system kernel 120 may be utilized to setup the pool of guest virtual operating system containers. The system kernel 120 may also be configured to provide a command line interpreter interface that allows users to request jobs, execute other operating system implemented applications, and interact with a virtual operating system in a manner that is substantially indistinguishable relative to an operating system executing on a bare metal device.

Generally, a job may be input by a user via a command line interpreter, such as a Unix shell terminal. More specifically, the user may express a computation using the same language as the language used by a Unix shell terminal. The actual request is submitted to the network service 110B. Indeed, a request may be submitted as an HTTP request to the network service 110B. The body of the request describes the computation to perform in terms of what commands are input into the command line interpreter, which is running within a container. Contrastingly systems that utilize multiple VMs that each comprises an operating system kernel, which are managed by a hypervisor, often require users to construct complex programs or scripts to perform compute operations. Compute operations for traditional VM systems require complex programming due to a complex framework that is used by the hypervisor to coordinate hardware emulation for each of the VMs.

Figure 3:
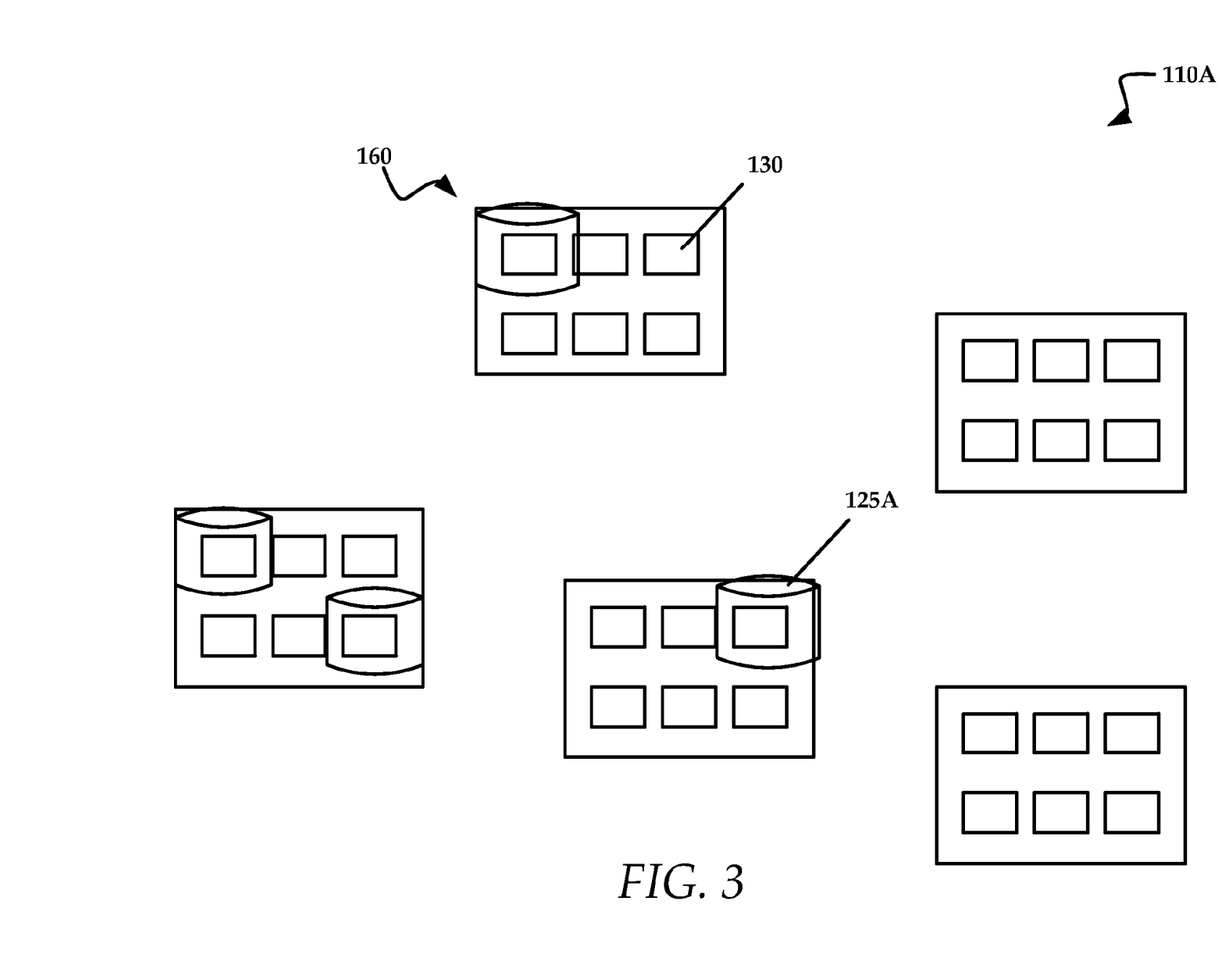
FIG. 3 is a schematic diagram illustrating the colocation of guest virtual operating system containers for multiple tenants on an object store.

Using the command line interpreter interface, the user may specify one or more desired compute operations that are to be executed against objects (such as object 130) within an object store 110A (see FIG. 3). It is noteworthy that the object store 110A may include, for example, a local or distributed object store that maintains contiguous blobs, blocks, or chunks of data. It will be understood that the objects stored in the object store 110A are complete objects, such as files or other similar data structures. Moreover, the compute operations executed against the object store 110A may be performed in such a way that partial stores of data are avoided.

In order to perform compute operations on objects for multiple users, the system kernel 120 may collocate containers 125A-N onto the object store 110A, and execute the containers 125A-N simultaneously. In FIG. 3, a plurality of containers, such as container 125A has been placed onto each of a plurality of objects within the object store 110A. Thus, a virtual operating system container is assigned to each of the plurality of objects specified in the user request. Most frequently, the assignment of a single container to a single object occurs when the system executes a "map" phase operation. The details of map and reduce phases provide by the system 110 will be described in greater detail below.

Broadly speaking, a virtual operating system container may be a lightweight virtualization solution offering a complete and secure user environment that operates on a single global kernel (system kernel 120), providing performance characteristics that are similar to operating systems that operate on bare metal devices. That is, a virtual machine operates on emulated hardware and is subject to control by a hypervisor, which produces computing inefficiencies. A virtual operating system container may operate without the computing inefficiencies of a typical virtual machine.

In some instances, the system kernel 120 may utilize a KVM (Kernel Virtual Machine) that improves the efficiency of the a virtual operating system, such as the global operating system kernel, by leveraging CPU virtualization extensions to eliminate a substantial majority of the binary translation (i.e., hardware emulation) that are frequently required by VMs.

Figure 2:
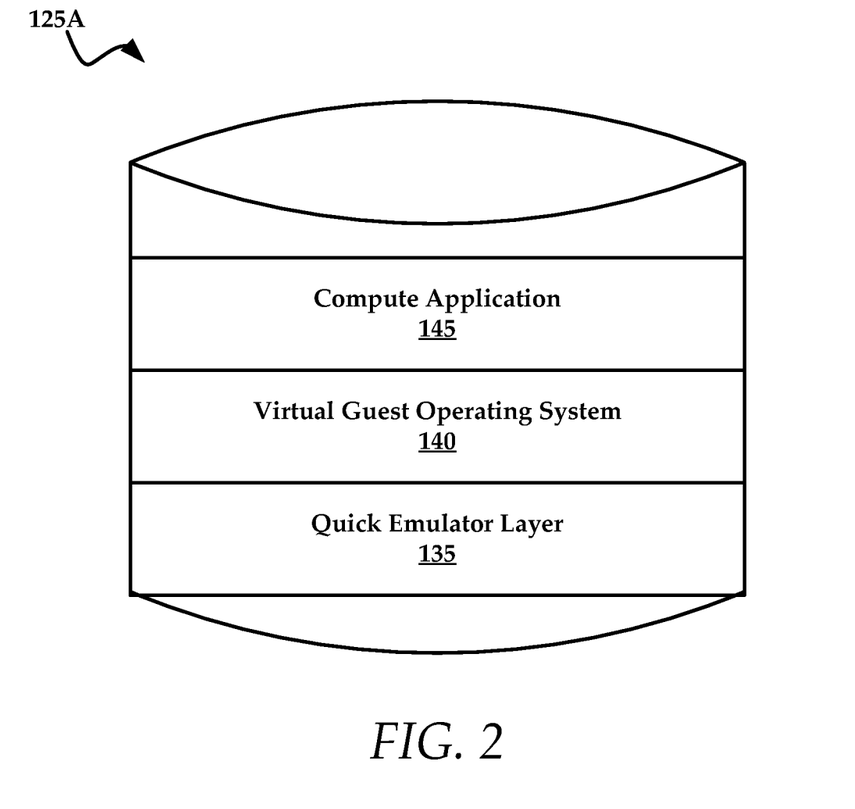
FIG. 2 is a schematic diagram of an exemplary guest virtual operating system container.

Turning to FIG. 2, an exemplary virtual operating system container 125A (FIG. 1) is shown as comprising a quick emulation layer (QEMU) 135, a virtual guest operating system 140, and a compute application 145 that is managed by the virtual guest operating system 140. The QEMU 135 provides hardware emulation and is also VMM (virtual machine monitor). It is noteworthy that in some embodiments the QEMU 135 is not a strict hypervisor layer, but rather each QEMU 135 may be independent in some exemplary embodiments. That is, there may be one QEMU 135 one per container instead of a single QEMU 135 supporting several VMs. Advantageously, the operations of both a VM and a VMM may be combined into the QEMU 135.

According to some embodiments, the compute application 145 that is executed may include a primitive O/S compute operation. Exemplary compute operations may include operating system primitive operations, such as query, word count, send, receive, and so forth. Additionally, the operations may comprise more sophisticated operations, such as operations that include audio or video transcoding. Additionally, in some instances, users may store programs or applications in the object store itself. Users may then execute the programs as a part of a compute operation.

In some instances the compute operations may include one or more phases such as a map phase, followed by a reduce phase. Generally, a map phase may include an operation that is executed against each of a plurality of objects individually, by a plurality of containers. In some instances, a unique container is assigned to each object that is to be processed.

In contrast, a reduce phase may be executed by a single container against a plurality of objects in a batch manner. Using an example such as word count, it will be assumed that the objects of the object store 110A may comprise text files. The application 145 may execute a map phase to count the words in each of the text files. The output of the application 145 may be stored in a plurality of output objects that are stored in the object store 110A. A compute application 145 of another container may execute a reduce phase that sums the output objects of the map phase and generates a word count for all objects within the object store 110A.

It will be understood that the system kernel 120 may schedule and coordinate various compute operations (and phases) performed by the compute applications 145 of all containers. In sum, the system kernel 120 may act similarly to a hypervisor that manages the compute operations of the various active containers. Based upon the request input by the user, the system kernel 120 may instruct the containers to perform a series of map functions, as well as a reduce functions. The map and reduce functions may be coordinated to produce the desired output specified in the request.

Turning to FIG. 3, after receiving a request from a user, the system kernel 120 may select a first set of containers, which includes container 125A from the pool of containers. This container 125A is assigned to a user. In response to receiving a request from a second user, the system kernel 120 may also select a second set of containers from the pool of containers.

Based upon the request received from the first tenant, the system kernel 120 may map the first set of containers to a plurality of objects, such as object 130, stored in the object store 110A. Likewise, the system kernel 120 may map a second set of containers to a plurality of different objects stored in the object store 110A for the second user. The objects and containers for the first user may be referred to as a compute zone of the first user, while the objects mapped to the container 125N may be referred to as a compute zone of the second user. The maintenance of compute zones allows the system kernel 120 to provide multitenant access to the object store 110A, even when the first and second users are potentially adversarial. For example, the first and second users may be commercial competitors. For security, the system kernel 120 maintains compute zones in order to balkanize object storage and prevent access to objects of other users. Additionally, the balkanization of object storage also ensures fair distribution of resources between users.

It will be understood that the system kernel 120 may maintain as many containers and compute zones as allowed by the processor(s) of the hardware layer 115. Additionally, the system kernel 120 assigns a container to a user on an as-needed basis, meaning that containers may not be assigned permanently to a user, which would result in a monopolization of resources when the user is not performing compute operations.

Figure 4:
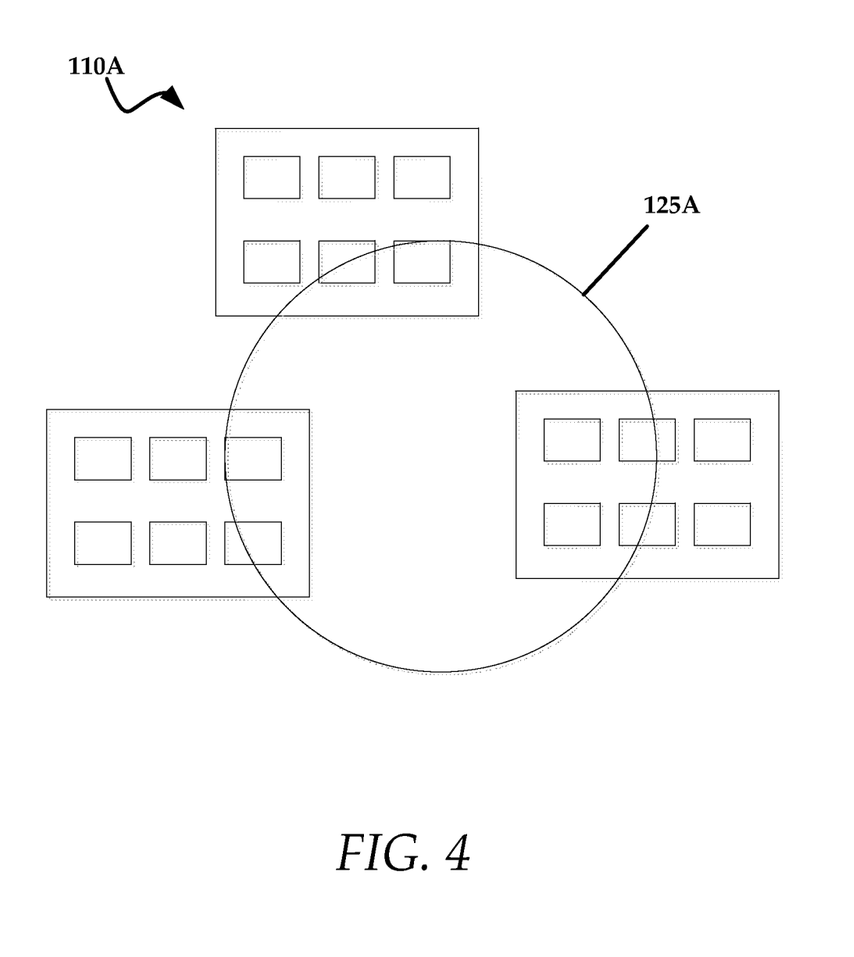
FIG. 4 is a schematic diagram of a guest virtual operating system container applied onto an object store.

FIG. 4 illustrates the placement of the container 125A onto the object store 110A. It is understood that the container 125A encircles a plurality of objects in the object store 110A. This mapping of multiple object to a single container would be commonly seen in a reduce phase, where the container is performing a concatenating or summation process on the outputs of individual containers, such as the containers shown in FIG. 3.

Additionally, because the container is placed onto the object store, the system kernel 120 need not transfer objects from the object store 110A into the container for processing in some exemplary embodiments. Advantageously, the container operates directly on the objects of the object store 110A.

According to some embodiments, the containers 125A-N managed by the system kernel 120 are empty when the containers 125A-N are in the pool. After objects are mapped to the container, compute operations may be executed by the container on the objects, and a desired output is generated, the system kernel 120 may clear the container and return the container to the pool.

In some instances, the system kernel 120 may not generate containers until a request is received from a user. That is, the system kernel 120 may "spin up" or launch containers when a request is received from the user. This allows for minimum impact to the bare metal resources, such as the CPU, as the system kernel 120 need not even maintain a pool of virtual operating system containers, which are awaiting user requests. That is, maintaining a pool of containers requires CPU and memory resources. When the compute operations have been completed, the system kernel 120 may terminate the containers, rather than clearing the containers and returning the containers to a pool.

In accordance with the present disclosure, an instruction set architecture may be implemented within the system 110. In some embodiments, the instruction set architecture may specify an application programming interface that allows the system 110 to interact with the distributed object store.

According to some embodiments, the system 110 communicatively couples with the object store 110A using a services related application programming interface (SAPI) 155, which may provide features such as automatic discovery of object stores, dynamic configuration of object stores, and an API for a user portal. In sum, the SAPI may allow users to configure, deploy, and upgrade applications using a set of loosely-coupled, federated services. In some embodiments, the SAPI may include an underlying API and an autoconfig agent, also referred to as a daemon 150. A SAPI client may also be disseminated to clients. It will be understood that the daemon 150 may be associated with a physical node 160 of the object store 110A.

In some embodiments according to the present disclosure, various object stores, such as object store 110A of FIGS. 3 and 4, comprise a single SAPI zone. It will be understood that the SAPI zone may be stateless and the SAPI zone may be configured to write objects into the object store 110A. In addition to storing objects, the SAPI zone may also communicatively couple with a VM API to provision zones and a network API (NAPI) to reserve network interface controllers (NIC) and lookup network universal unique identifiers (UUID).

It will be understood that the SAPI 155 may comprise main object types including but not limited to applications, services, and instances. It is noteworthy that an application may comprise one or more services, and each service may comprise one or more instances. Moreover, instances may represent actual object store zones, and such zones inherit zone parameters and metadata from their associated applications and services.

Also, the application, service, and instance information may be used by the compute application of a virtual operating system container that is placed onto an object store. The daemon 150 may control the operation of the containers operating on the daemon's object store.

The various applications, services, and instances may include three sets of properties. For example, "params" may comprise zone parameters like a zone's RAM size, disk quota, image UUID, and so forth. These parameters are evaluated when a zone is provisioned. Another property may comprise "metadata," which defines metadata available to the daemon 150. These metadata keys and values form the input of a script template in a configuration manifest (described below). As these values are updated, the daemon 150 may rewrite any configuration and make reference to changed metadata values. Yet another property may comprise "manifests" that define a set of configuration manifests are indexed by name to facilitate inheriting manifest from parent objects.

It is noteworthy that creating applications and services have no effect on running zones in some exemplary embodiments. When an instance is created, a zone is provisioned using the above information from its associated application, service, and instance. Stated otherwise, applications and services (e.g., a job or request) may be defined separately from the objects that the applications and services are to be executed against. Thus, a job may be thought of abstractly as a workflow template. Advantageously, when the user requests the execution of a job, objects need only be defined by the user. The workflow template is then applied against the objects.

In some embodiments, the daemon 150 of a zone may be tasked with maintaining configuration inside that zone. The daemon 150 queries the SAPI 155 directly to determine which files to write and where to write them within the object store 110A.

The daemon 150 uses objects called configuration manifests; those objects describe the contents, location, and semantics of configuration files for a zone. Those manifests contain a script template which is rendered using the metadata from the associated application, service, and instance.

When a user provides a request to the system 110, the system kernel 120 may coordinate a compute flow of compute operations which are managed by the daemon 150. That is, the system kernel 120 may receive a request or "job" from a user, via a command line interpreter. The request identifies parameters of a compute operation that is to be executed against objects in a distributed object store. For example, a request may include performing a word count operation on a file.

To facilitate compute flow during the compute process, the system kernel 120 may assign an input key for the request. This input key provides a unique identifier that allows objects and outputs of compute operations to be correlated to the user. Objects previously stored in the object store may be correlated to the user utilizing a unique identifier.

The user may also identify objects for the compute operation, using, for example, the command line interpreter. An exemplary find object command may include Find|User|Object Store Location; where the Object Store Location defines the object store that includes the object(s) which are necessary for execution of the compute operation.

In some instances, the system kernel 120 may query various daemons of object stores to locate the objects within the distributed object store. After the object have been located, the system kernel 120 may generate a set of tasks (e.g., an instruction set) that defines the various compute operations that are to be performed by the daemon of the located object store. In the example provided above, the set of tasks may include only one word count task that is provided to a single daemon of an object store (e.g., physical node). This relatively simple compute operation does not require coordination or scheduling of operations of multiple objects.

The daemon 150 may provide instructions to one or more virtual operating system containers that are placed onto the object store by the system kernel 120. That is, the instruction sets provided to the containers is based upon the task assigned to the daemon 150 from the system kernel 120.

In some instances, the set of tasks may include a more complex arrangement of operations that are executed against a plurality of objects stores. The system kernel 120 may interact with the daemon to coordinate processing of these objects in a specified order.

Additionally, the set of tasks may define various map phases that are to be executed on the objects of the object store, as well as various reduce phases that are executed on the outputs of the map phases. It will be understood that objects within the workflow may be tracked and correlated together using the input key established by the system kernel 120. For example, if an instruction set passed to a daemon requires performing a word count compute operation on 100 text files, each of the objects of the compute operation may be correlated using the input key in some embodiments. Thus, the objects of the compute operation could comprise 100 objects that each (in some embodiments) includes a word count value for their corresponding text file. The input key may be appended to the object as metadata.

It will also be understood that a map phase may result in multiple outputs, which are generated from a single input object. For example, assume that usage logs for a computing device are stored for a 24 hour time period. To determine hourly usage rates, the 24 hour log object may be separated into 24 distinct objects. Thus, the map phase may receive the 24 hour log object and may split the same into constituent output objects to complete the map phase.

It will be understood that a more complex request may require a more complicated set of tasks (e.g., phases). For example, if the user desires to look at all 11 p.m. to 12 p.m. user logs for a plurality of computing devices, the set of tasks may require not only the map task where a single input object is processed into multiple objects, but also a reduce phase that sums a plurality of 11 p.m. to 12 p.m. user logs for a plurality of devices.

In sum, the system kernel 120 may provide a daemon with tasks that include a map phase for generating the hour increment logs from various input objects. Additionally, the tasks also inform the daemon to return the output objects, which may be stored as an aggregate 11 p.m. to 12 p.m. log object within the object store.

It will be understood that the daemon of a physical node (e.g., object store) may control execution of compute operations by the one or more virtual operating system containers that are placed onto the object store via the system kernel 120.

Thus, it is appreciated with that intermediate output objects may not be output to the user directly, but may be fed back into the system for additional processing, such as with the map and reduce phases described above. Moreover, the set of tasks generated by the system kernel 120 may include any number of map phases and/or reduce phases, which vary according to the steps required to produce the desired output.

Returning to FIG. 1, the system kernel 120 may, in some instances, be referred to as a global zone, while the individual virtual operating system containers may be referred to as guest compute zones. Generally, a guest compute zone may also be referred to as a guest virtual operating system container, as described above.

Generally, the daemon 150 may be coupled with the system kernel 120 that runs in the global zone (e.g., global operating system kernel) of participating compute and physical nodes. The daemon 150 may manage tasks run on that node. Additionally, the daemon 150 is responsible for setting up compute zones for user jobs, executing the jobs, monitoring the user code (instruction sets generated from request parameters), tearing down the zones, and emitting progress updates to the appropriate job executors. This daemon 150 is closely coupled with a lackey that runs in the compute zones and manages task execution in that zone.

Recall that users submit "jobs" to the system 110, and each job is made up of one or more phases in which a user command is invoked on a single object at a time (for map phases) or many objects at once (for reduce phases). To execute each phase, the system kernel 120 divides the work into individual map and/or reduce "tasks," with each task representing a single execution of the user's command on one or more objects in some embodiments.

To preserve isolation (where a user only has access to their objects), tasks are executed inside dedicated compute zones that are reset to their initial state in between tenants. But because this reset function requires computing resources, tasks are allowed to run sequentially in a single compute zone without resetting the zone, as long as all such tasks belong to the same "task group," meaning that these tasks belong to the same job and phase.

While the tasks executed sequentially in a zone are part of one task group, tasks from a single group may be run in parallel "task streams," where each stream executed in its own zone. Since some tasks in a group may take longer than others to execute, in order to maximize concurrency within each group, a task may not be assigned to a particular stream until the corresponding zone is actually ready to execute the task.

Generally, task groups may be referred to as jobs. Tasks in different jobs cannot be executed in the same zone without resetting the zone between them, in some embodiments. Rather, different phases of the same job may be treated by the system as separate jobs relative to executing zone resets. With regard to task scheduling, the system 110 may implement a scheduling algorithm for scheduling tasks on compute zones is driven by several principles.

First, the system 110 may be optimized to allow the system kernel 120 to do as much of the scheduling duties as possible. The system kernel 120 is good at scheduling heavy workloads on finite resources and deals well with CPU saturation. This principle illuminates the advantages of configuring systems with as many zones as possible to make sure the system kernel 120 has plenty of work with which to make best use of the CPUs.

According to some embodiments, the system kernel 120 should be responsive to incoming jobs, even when the system kernel 120 is already very busy. To accomplish this, the system kernel 120 may establish a threshold of "reserve" zones that are available only to newly arriving task groups. From an implementation perspective, when the number of available zones drops below the reserve threshold, existing task groups cannot grow to use the remaining zones. Thus, only newly created task groups can use the remaining zones, and each new group can only use one zone. This policy allows newly submitted jobs, small or large, to get initial results quickly even when large jobs are occupying most of the CPU resources of the system 110.

The system kernel 120 may be configured to ensure that all task groups should share the non-reserved zones in a fair manner. For example, if there is only one task group, the system kernel 120 should allow that task group to run on all non-reserved zones. If there are two task groups of equal size (see below), these task groups should each get half of the non-reserved zones.

The share of zones of a task group is determined by the system kernel 120 by evaluating the number of tasks ready to run in that group, divided by the total number of tasks ready to run in the system. Advantageously, the share cannot be less than one zone. It will be understood that because the system kernel 120 uses a fair task division instead of counting each task group, the system kernel 120 may avoid having users break up large jobs into multiple smaller ones just to get more concurrency. Other types of fairness policies may be implemented by the system kernel 120. For example, the system kernel 120 may establish priorities for users, such that certain users may be given higher priority and preferred task prioritization and access compared to other users of lower priority.

As an example, if a system with 512 non-reserved zones has one task group with 50 tasks ready to run and another task group with 150 tasks ready to run, then the first group gets 128 zones and the second group gets 384 in some embodiments.

It is noteworthy that setting up a zone for a particular task group is relatively cheap (in terms of computing resource consumption) and that running additional sequential tasks from the same group in the same zone is "free," but that resetting a zone for use by a different group may be relatively more expensive from a workload perspective. As a result, when there is a "tie" for the number of shares, the system kernel 120 keeps a zone running for a task group that is already running. For example, if a 512-zone box is saturated with task groups, where each task is scheduled on one zone, and another task group arrives, the arriving task group will be queued by the system kernel 120 until one of the other task groups completes, since the task groups all have the same number of shares.

Exemplary Uses Cases

Example 1

Maximizing utilization and sharing resources fairly. On an idle system, a large task group arrives to process thousands of objects. This group is scheduled on all of the non-reserve zones. When a second large task group arrives, the system kernel 120 gradually switches half of the zones to processing the new task group. When a third large group arrives, each of the three groups is scheduled by the system kernel 120 onto one third of the available zones.

Example 2

Maintaining responsiveness for incoming small jobs. On an idle system, a large task group arrives to process thousands of objects. As described in Example 1, this group will be scheduled onto all of the system's non-reserve zones. When a small group arrives to process a single task, it immediately gets scheduled onto one of the reserve zones by the system kernel 120. Additional tasks for the same group may be scheduled by the system kernel 120 on the same zone. If the number of tasks grows large, its growing share causes it to be scheduled on some of the zones previously used for the first group, as described in Example 1.

Example 3

A saturated system. Assume that a system is saturated with as many task groups as there are available zones, including reserves. Each task group is thus scheduled onto exactly one zone. As additional task groups arrive, they will be unable to run until one of the existing task groups completes.

Example 4

A pathological job. On an idle system, a large task group arrives whose execution goes into an infinite loop. All non-reserve zones are occupied in this loop. As new small groups arrive, these new groups are allowed to run immediately in a reserve zone (see Example 2). But if one of these groups becomes large, this large group is not immediately allowed by the system kernel 120 to get its expected half of the zones, since most of the zones are still occupied in the loop. Eventually, the system kernel 120 decides that the first job's desired concurrency has exceeded its actual concurrency by too much for too long and the system kernel 120 begins terminating these tasks, allowing the second large job to take some of the zones.

With all this in mind, the actual scheduling algorithm implemented by the system kernel 120 may begin when a new task arrives. If the task does not belong to any existing task group, and there is a zone available to run the task (reserve or not), then the task is scheduled on that zone. If there are no zones available, then the newly created task group is en-queued (in first-in-first-out (FIFO) order) on a ready-to-run queue. If the task belongs to an existing task group and the system has at least "nreserve+1" zones available, then the task is scheduled on any available zone. Otherwise, the task is en-queued in its task group. The fact that "nreserve" zones are off limits to existing task groups ensures responsiveness for new task groups, and the fact that the expansion is otherwise unbounded ensures that jobs can expand to use all of the non-reserve resources.

The system kernel 120 may also manage termination of zones, such as when a zone finishes executing a task. If the zone is the only zone executing tasks for the given task group, then the zone picks up the next task in the same task group. This pickup feature of the zone results from system principles that specify that all groups are entitled to at least one zone. Moreover, it is undesirable to reset a zone for a different group when the system kernel 120 will be required to reset the zone again to finish the group which is currently being executed. Otherwise, if there are any task groups on the ready-to-run queue, the zone resets and picks up the task group which has been waiting the longest.

By proportion, the waiting task group has a delta between desired concurrency (at least one) and actual concurrency (zero for a percentage delta of infinity) that exceeds that of the current zone. Otherwise, all task groups must already be scheduled on at least one zone, but the distribution may not match the desired concurrency levels for each task group. First, the system kernel 120 computes whether a group would be above or below its desired concurrency if the current zone is assigned to a different group. If the system kernel 120 determines that the group is not above or below the zone picks up the next task in the same task group. Otherwise, the zone resets and switches to the task group with the biggest delta between actual and desired concurrency. The system kernel 120 executes this analysis by iterating all the task groups.

With regard to user authentication within the system 110, it will be understood that the daemon 150 may communicate with containers within a zone to manage an assigned compute task. The container(s) forward output to the daemon 150. It is noteworthy that the daemon 150 may maintain a separate http server for each or at least a plurality of compute zones. Advantageously, the daemon 150 also tracks requests and the socket on which the request was received. The daemon 150 also tracks the compute zone associated with the request, as well as tasks associated with the compute zone. Furthermore, the daemon 150 may track which tasks are assigned to a particular zone.

Because the user is linked to the task via the input key, the daemon 150 may leverage this chain of linkages between users, tasks, and zones, and automatically authenticate the user. That is, the user may not be required to input authentication credentials to submit sequential tasks to a zone, if the zone is already running. In sum, the user is authenticated to submit any request within the compute zone.

Figure 5:
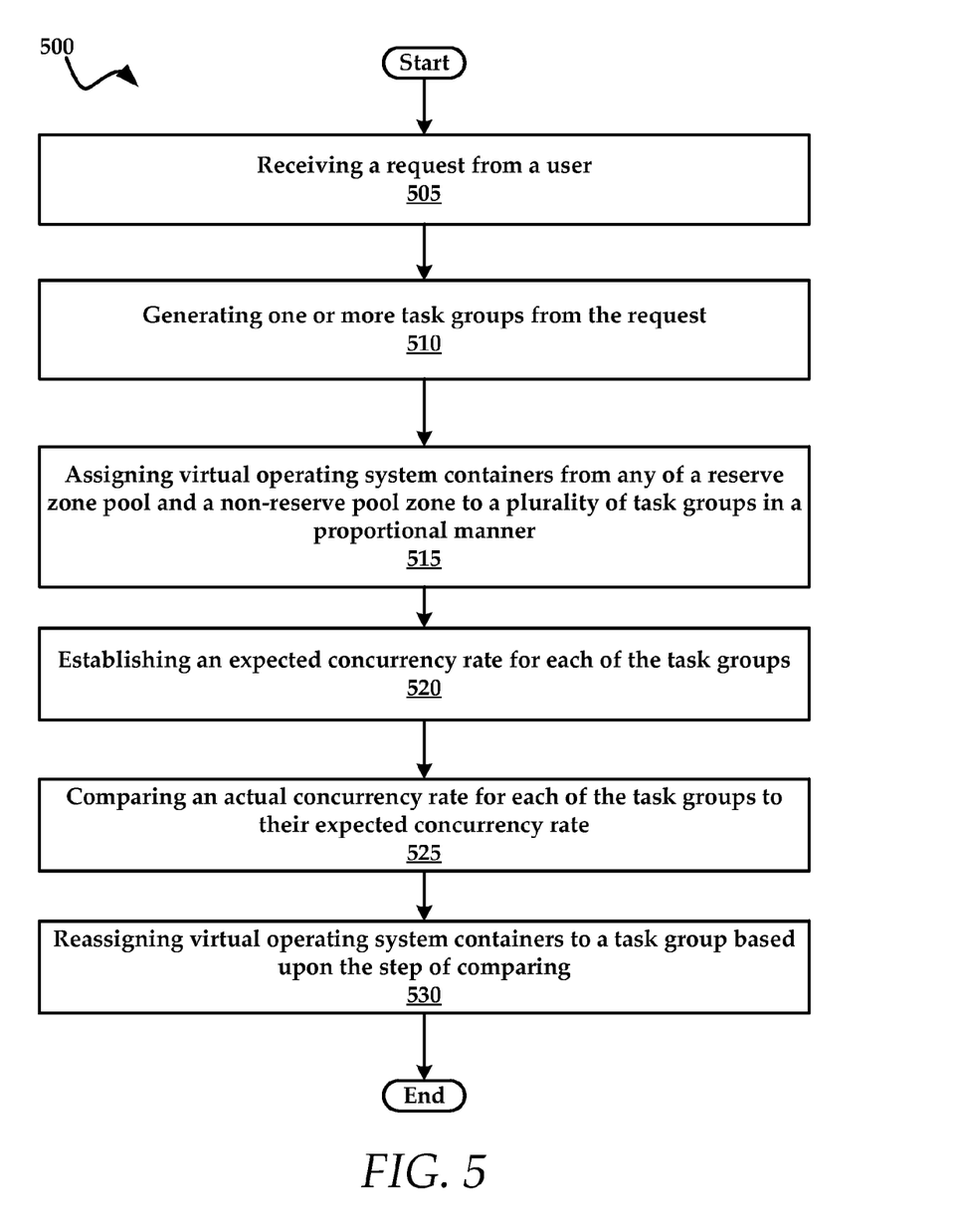
FIG. 5 is a flowchart of an exemplary method for assigning compute zones to task groups.

FIG. 5 is a flowchart of an exemplary method 500 for assigning compute zones to task groups. Generally, the method 500 may comprise a step 505 of receiving a request from a user. As mentioned above, the request may comprise a set of tasks that are generated from compute operations specified by the user. In step 510, method may include generating one or more task groups from the request. It is noteworthy that a task group may include a set of tasks for a particular phase, such as the map and reduce phases described above.

Additionally, the method may include a step 515 of assigning virtual operating system containers from any of a reserve zone pool and a non-reserve pool zone to a plurality of task groups in a proportional manner.

After assignment of virtual operating system containers, the method may include a step 520 of establishing an expected concurrency rate for each or at least a plurality of the task groups. The expected concurrency rate may include a desired concurrency rate that is specified by the user, or may be determined from an analysis of the requirements of a user over a period of time (e.g., historical context).

The method may then include a step 525 of comparing an actual concurrency rate for each or at least a plurality of the task groups to their expected concurrency rate. That is, the system monitors the concurrency rates of the task groups and compares them to their expected values. The comparison may be executed by calculating a concurrency delta, which is an expected versus actual metric.

The method may include a step 530 of reassigning virtual operating system containers to a task group based upon the step of comparing. Assignment may occur based upon the concurrency delta, where task groups that have large concurrency deltas are preferred for assignment relative to task groups with smaller concurrency deltas.

The step 530 of assigning may also include evaluating the tasks in the task group relative to a total number of tasks for the system. A task group may be assigned virtual operating system containers from either the reserve and/or non-reserve zone pools, based upon the this type of evaluation. By way of example, a task group that currently includes a large number of tasks may be assigned a larger number of zones, relative to a task group with fewer tasks.

Figure 6:
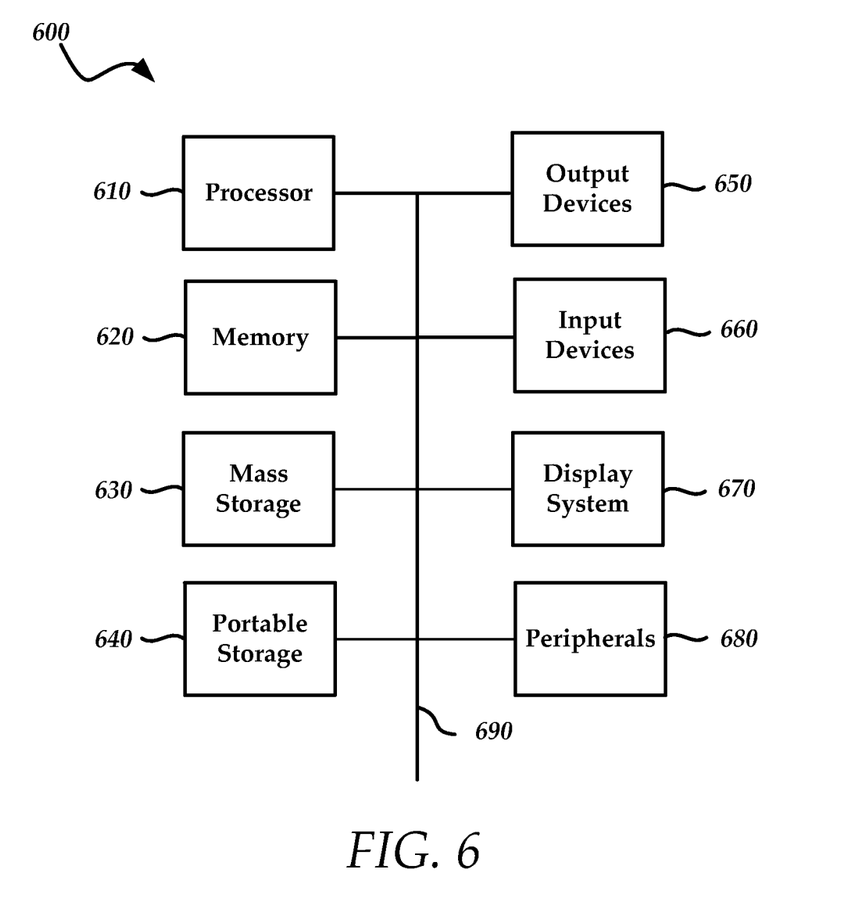
FIG. 6 illustrates an exemplary computing system that may be used to implement embodiments according to the present technology.

FIG. 6 illustrates an exemplary computing system 600 that may be used to implement an embodiment of the present systems and methods. The system 600 of FIG. 6 may be implemented in the contexts of the likes of computing systems, networks, servers, or combinations thereof. The computing system 600 of FIG. 6 includes one or more processors 610 and main memory 620. Main memory 620 stores, in part, instructions and data for execution by processor 610. Main memory 620 may store the executable code when in operation. The system 600 of FIG. 6 further includes a mass storage device 630, portable storage device 640, output devices 650, user input devices 660, a display system 670, and peripheral devices 680.

The components shown in FIG. 6 are depicted as being connected via a single bus 690. The components may be connected through one or more data transport means. Processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive or an optical disk drive, is a non-volatile storage device for storing data and instructions for use by processor unit 610. Mass storage device 630 may store the system software for implementing embodiments of the present technology for purposes of loading that software into main memory 620.

Portable storage device 640 operates in conjunction with a portable non-volatile storage medium, such as a floppy disk, compact disk, digital video disc, or USB storage device, to input and output data and code to and from the computer system 600 of FIG. 6. The system software for implementing embodiments of the present technology may be stored on such a portable medium and input to the computer system 600 via the portable storage device 640.

User input devices 660 provide a portion of a user interface. User input devices 660 may include an alphanumeric keypad, such as a keyboard, for inputting alpha-numeric and other information, or a pointing device, such as a mouse, a trackball, stylus, or cursor direction keys. Additional user input devices 660 may comprise, but are not limited to, devices such as speech recognition systems, facial recognition systems, motion-based input systems, gesture-based systems, and so forth. For example, user input devices 660 may include a touchscreen. Additionally, the system 600 as shown in FIG. 6 includes output devices 650. Suitable output devices include speakers, printers, network interfaces, and monitors.

Display system 670 may include a liquid crystal display (LCD) or other suitable display device. Display system 670 receives textual and graphical information, and processes the information for output to the display device.

Peripherals device(s) 680 may include any type of computer support device to add additional functionality to the computer system. Peripheral device(s) 680 may include a modem or a router.

The components provided in the computer system 600 of FIG. 6 are those typically found in computer systems that may be suitable for use with embodiments of the present technology and are intended to represent a broad category of such computer components that are well known in the art. Thus, the computer system 600 of FIG. 6 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system, comprising:
    one or more processors; and
    logic encoded in one or more tangible media for execution by the one or more processors and when executed operable to perform operations comprising:
        assigning a virtual operating system container, operating on a single global kernel, from any of a reserve zone pool and a non-reserve zone pool to a task group, the task group comprising a set of tasks for a phase of a request, the phase comprising any of map or reduce;
        executing the set of tasks within the assigned virtual operating system container; and
        comparing an actual concurrency rate for each of a plurality of task groups to their expected concurrency rate,
            the comparing comprising determining a concurrency delta for each of the task groups of the plurality of task groups; and further comprising prioritizing the assignment of virtual operating system containers to the task groups based upon their concurrency deltas, and
            the task group of the plurality of task groups with a largest concurrency delta being assigned a virtual operating system container first.

2. The system according to claim 1, wherein an amount of reserve zones established in the reserve zone pool is based upon resources available to the single global kernel.

3. The system according to claim 1, wherein the logic when executed is further operable to perform operations comprising separating the request into one or more phases; and generating a set of tasks for each of the one or more phases.

4. The system according to claim 3, wherein the logic when executed is further operable to perform operations comprising grouping a set of tasks for a phase into a task group.

5. The system according to claim 1, wherein the logic when executed is further operable to perform operations comprising assigning a plurality of tasks from a task group to a plurality of zones selected from any of the reserve zone pool and the non-reserve zone pool.

6. The system according to claim 1, wherein the logic when executed is further operable to perform operations comprising:
- comparing phases of sequential tasks submitted to a virtual operating system container;
- resetting the virtual operating system container if the phases of the sequential tasks are different from one another; and
- processing the sequential tasks with the virtual operating system container without resetting the virtual operating system container based upon the phases of the sequential tasks.

7. The system according to claim 1, wherein the logic when executed is further operable to perform operations comprising placing the set of tasks into a first in first out (FIFO) queue when resources are not available to begin executing the set of tasks immediately.

8. The system according to claim 7, wherein the logic when executed is further operable to perform operations comprising monitoring the assigned virtual operating system container for termination of a task; and submitting another task to the virtual operating system container from the FIFO queue.

9. A system, comprising:
- one or more processors; and
- logic encoded in one or more tangible media for execution by the one or more processors and when executed operable to perform operations comprising:
  - establishing a reserve zone pool of virtual operating system containers, operating on a single global kernel;
  - assigning a virtual operating system container from the reserve zone pool to a task group, the task group comprising a set of tasks for a phase of a first request, the phase comprising any of map or reduce;
  - executing the set of tasks within the assigned virtual operating system container; and
  - comparing an actual concurrency rate for each of a plurality of task groups to their expected concurrency rate,
    - the comparing comprising determining a concurrency delta for each of the task groups of the plurality of task groups; and further comprising prioritizing the assignment of virtual operating system containers to the task groups based upon their concurrency deltas, and
    - the task group of the plurality of task groups with a largest concurrency delta being assigned a virtual operating system container first.

10. The system according to claim 9, wherein the logic when executed is further operable to perform operations comprising establishing a reserve threshold for assigning the virtual operating system container, wherein when the reserve zone pool of virtual operating system containers falls below the reserve threshold, the system assigns the virtual operating system container to only newly submitted task groups.

11. The system according to claim 9, wherein the logic when executed is further operable to perform operations comprising assigning virtual operating system containers from a non-reserve pool to a plurality of task groups according to an assignment policy.

12. The system according to claim 11, wherein the assignment policy specifies that virtual operating system containers from the non-reserve pool are assigned to the plurality of task groups based on a number of virtual operating system containers currently assigned to each of the plurality of task groups.

13. The system according to claim 11, wherein when a virtual operating system container assigned to a task group from the reserve pool zone is currently processing the set of tasks, the system may be further configured to assign at least a portion of the tasks within the set of tasks to one or more virtual operating system containers of the non-reserved pool zone if any are available.

14. The system according to claim 9, wherein the phase comprises any of:
- a map phase where virtual operating system containers perform a first process on a plurality of single objects of one or more physical nodes;
- a reduce phase where a virtual operating system container performs a second process on a plurality of output objects of the map phase; and
- any combination of map phases and reduce phases.

15. A method, comprising:
- establishing a reserve zone pool of virtual operating system containers, operating on a single global kernel, the reserve zone pool of virtual operating systems being available only to newly arriving task groups;
- assigning virtual operating system containers from any of a reserve zone pool and a non-reserve pool zone to a plurality of task groups;
- establishing an expected concurrency rate for each of the task groups;
- comparing an actual concurrency rate for each of the task groups to their expected concurrency rate; and
- reassigning virtual operating system containers to a task group based upon the step of comparing,
  - the comparing comprising determining a concurrency delta for each task group; and further comprising prioritizing the assignment of virtual operating system containers to the task groups based upon their concurrency deltas, and
  - the task group with a largest concurrency delta being assigned a virtual operating system container first.

16. The method according to claim 15, wherein a virtual operating system container performs a compute operation on an object in such a way that the object is not moved from a store of the object.

17. The method according to claim 15, wherein assigning comprises placing the virtual operating system container on top of an object of a physical node.

* * * * *